United States Patent
Manalansan

(10) Patent No.: US 10,848,627 B2
(45) Date of Patent: Nov. 24, 2020

(54) ELECTRONIC APPARATUS SUPPORTING CREATION OF E-MAIL, IMAGE FORMING APPARATUS, E-MAIL CREATION SUPPORT METHOD, AND COMPUTER-READABLE NON-TRANSITORY RECORDING MEDIUM WITH E-MAIL CREATION SUPPORT PROGRAM STORED THEREON

(71) Applicant: KYOCERA Document Solutions Inc., Osaka (JP)

(72) Inventor: Lotes Manalansan, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/549,386

(22) Filed: Aug. 23, 2019

(65) Prior Publication Data

US 2020/0076964 A1     Mar. 5, 2020

(30) Foreign Application Priority Data

Sep. 5, 2018   (JP) ................................ 2018-166374

(51) Int. Cl.
*G06F 3/12*       (2006.01)
*H04N 1/00*       (2006.01)

(52) U.S. Cl.
CPC ..... *H04N 1/00209* (2013.01); *H04N 1/00326* (2013.01); *H04N 1/00358* (2013.01)

(58) Field of Classification Search
None
See application file for complete search history.

(56) References Cited

U.S. PATENT DOCUMENTS

| | | | | |
|---|---|---|---|---|
| 6,980,331 B1 * | 12/2005 | Mooney | ............. | H04N 1/00358 358/3.28 |
| 2005/0195446 A1 * | 9/2005 | Kasatani | ............ | H04N 1/00222 358/402 |
| 2017/0237868 A1 * | 8/2017 | Sato | .................... | G06K 9/00469 358/402 |

FOREIGN PATENT DOCUMENTS

| | | |
|---|---|---|
| JP | 2001-211277 A | 8/2001 |
| JP | 2005-244411 A | 9/2005 |

* cited by examiner

*Primary Examiner* — Henok Shiferaw
(74) *Attorney, Agent, or Firm* — IP Business Solutions, LLC

(57) ABSTRACT

An electronic apparatus includes a storage device, an image reading device, and a controller. The controller detects, from a text included in an image of a document read by the image reading device, a first prescribed word, extracts a text portion of a predetermined length continuous before or after the first prescribed word detected, calculates, by keyword groups stored in the storage device, a number representing matching between the keyword belonging to a keyword group and a character string included in the text portion extracted, reads out from the storage device an address associated with the keyword group having a largest number in the number representing the matching, and creates an e-mail a destination address of which is the address read out.

7 Claims, 10 Drawing Sheets

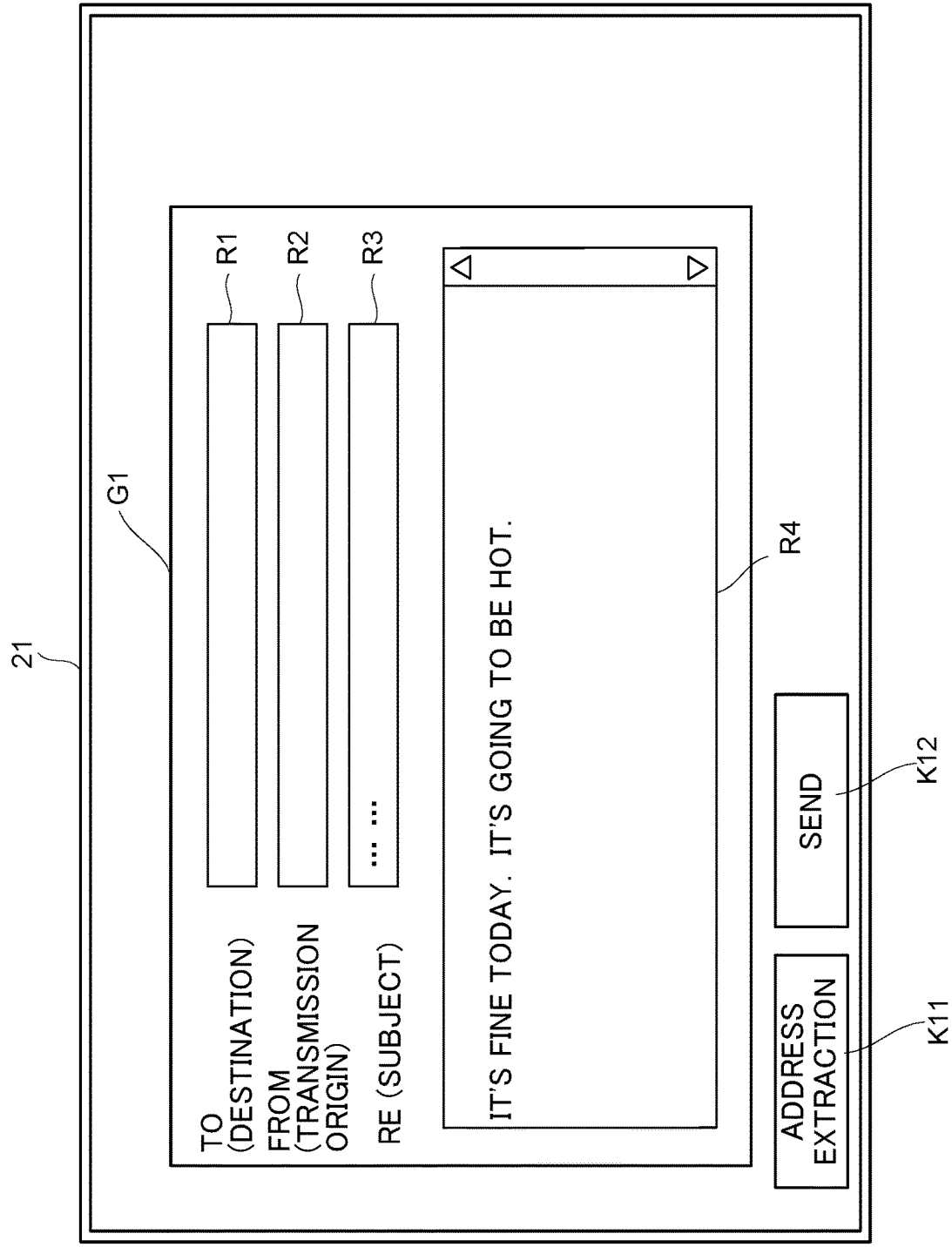

Fig.5

| KEYWORD GROUP | KEYWORD | NAME OF ADDRESS GROUP | ADDRESS |
|---|---|---|---|
| GA1 | Lotes,Labores | | Lotes.Labores@ddp.com |
| GA2 | Laura,Labores | | Laura.Labores@ddp.com |
| GA3 | Lotes,Key | | Lotes.Key@ddp.com |
| ... | ... | ... | ... |
| GAN | | | |
| GG1 | MANAGERS | PDDK DIVISION MANAGERS | Lotes@ddp.com |
| GG2 | MANAGERS | PDDK ALL MANAGERS | Laura@ddp.com |
| GG3 | MEMBERS | PDDK ALL MEMBERS | |
| ... | ... | ... | ... |
| GGM | | | |

Fig.6A

| ADDRESS ASSOCIATED WITH KEYWORD GROUP | NUMBER OF MATCHING |
|---|---|
| Lotes.Labores@ddp.com | 2 |
| Laura.Labores@ddp.com | 1 |
| Lotes.Key@ddp.com | 1 |

Fig.6B

| ADDRESS ASSOCIATED WITH KEYWORD GROUP | NUMBER OF MATCHING |
|---|---|
| PDDK DIVISION MANAGERS | 1 |
| PDDK ALL MANAGERS | 1 |
| PDDK ALL MEMBERS | 0 |

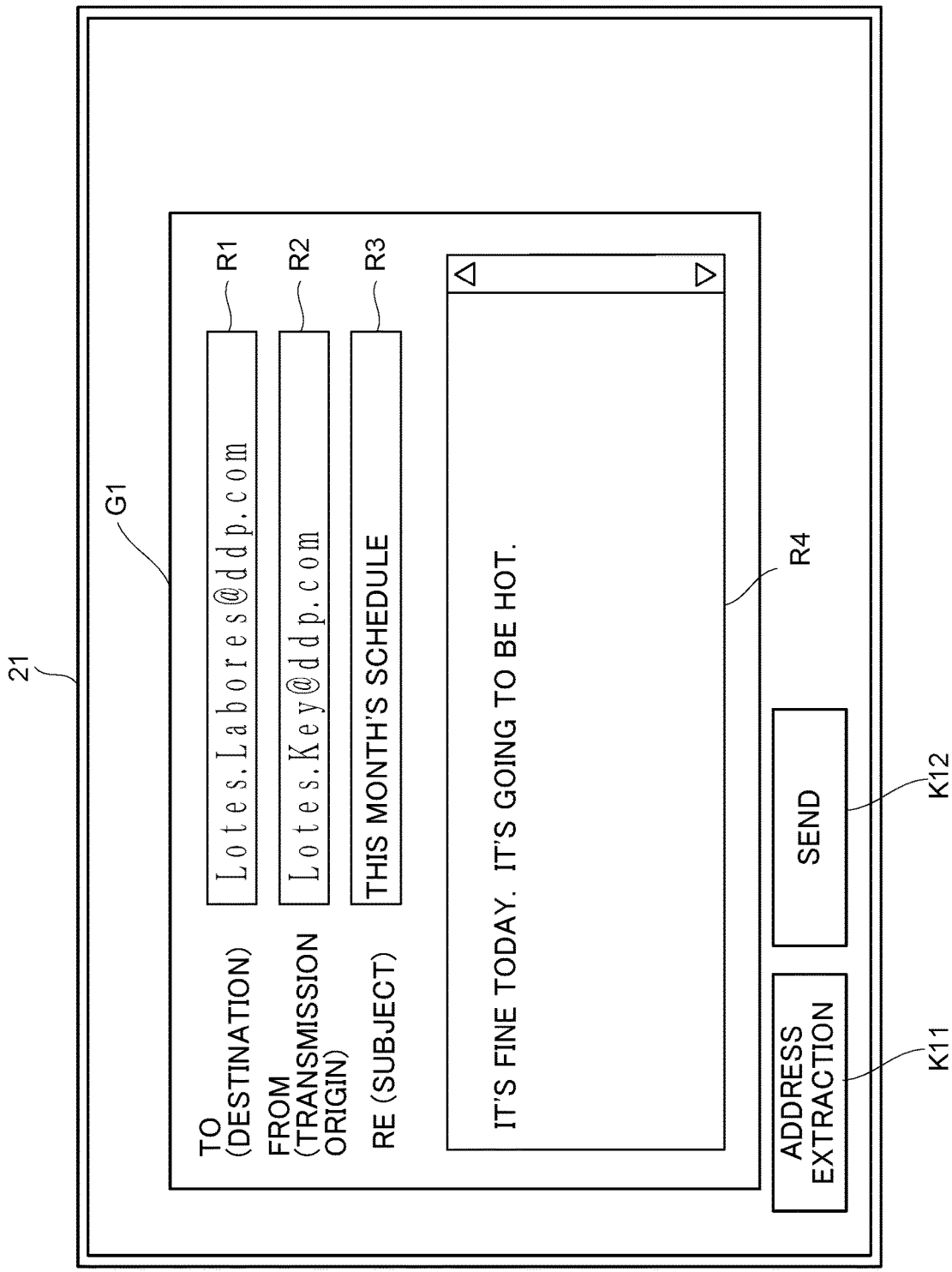

Fig.8

| KEYWORD GROUP | KEYWORD D | NAME OF ADDRESS GROUP | ADDRESS | FIXED FORM SENTENCE |
|---|---|---|---|---|
| GA1 | Lotes,Labores | | Lotes.Labores@ddp.com | I HOPE YOU ARE DOING... |
| GA2 | Laura,Labores | | Laura.Labores@ddp.com | I HOPE THIS EMAIL FINDS YOU... |
| GA3 | Lotes,Key | | Lotes.Key@ddp.com | THANK YOU FOR YOUR... |
| ... | ... | ... | ... | ... |
| GAN | | | | |
| GG1 | MANAGERS | PDDK DIVISION MANAGERS | Lotes@ddp.com | |
| GG2 | MANAGERS | PDDK ALL MANAGERS | Laura@ddp.com | |
| GG3 | MEMBERS | PDDK ALL MEMBERS | | |
| ... | ... | ... | ... | |
| GGM | | | | |

ELECTRONIC APPARATUS SUPPORTING CREATION OF E-MAIL, IMAGE FORMING APPARATUS, E-MAIL CREATION SUPPORT METHOD, AND COMPUTER-READABLE NON-TRANSITORY RECORDING MEDIUM WITH E-MAIL CREATION SUPPORT PROGRAM STORED THEREON

INCORPORATION BY REFERENCE

This application claims priority to Japanese Patent Application No. 2018-166374 filed on 5 Sep. 2018, the entire contents of which are incorporated by reference herein.

BACKGROUND

The present disclosure relates to an electronic apparatus, an image forming apparatus, an e-mail creation support method, and a computer-readable non-transitory recording medium with an e-mail creation support program stored thereon. Particularly, the disclosure relates to a technique for creating an address to be a destination of an e-mail.

Electronic apparatuses such as image forming apparatuses are apparatuses that read images on documents and form images on the read onto recording sheets. There are also ones having multi-functions, such as, being quipped with functions for sending and receiving e-mails. For example, there are known network multi-function machines that read images on documents, perform OCR processing on the images on the documents read to extract destinations, subjects, and body texts from the image on the document, and set the extracted destinations, subjects, and body texts as the destinations, the subjects, and the main body texts of e-mails. The aforesaid technique is capable of saving the trouble of performing operation of entering the destination, subject, and body text.

In addition, there are known apparatuses that, in detecting, in predetermined areas of the documents, destination information embedded in documents and recognizing, convert the destination information into text format data, use the converted destination information, and automate transmission of e-mails.

SUMMARY

A technique improved over the aforementioned technique is proposed as one aspect of the present disclosure.

An electronic apparatus of the one aspect of the present disclosure includes a storage device, an image reading device, and a controller. In the storage device, a keyword belonging to a keyword group and at least one address associated with the keyword group are stored for each of a plurality of keyword groups. The image reading device reads an image on a document. The controller includes a processor and, when the processor executes an e-mail creation support program, functions so as to: recognize a text included in the image on the document read by the image reading device; detect, from the text recognized, a first prescribed word set beforehand and extract a text portion of a predetermined length continuous before or after the first prescribed word detected; calculate, by each of the keyword groups stored in the storage device, a number representing matching between the keyword belonging to the keyword group and a character string included in the text portion extracted; select a keyword group having a largest number in the number representing the matching calculated; read out from the storage device the address associated with the keyword group selected; and create an e-mail a destination address of which is the address read out.

An image forming apparatus according to another aspect of the present disclosure includes the electronic apparatus described above and an image forming device. The image forming device forms an image on a recording medium.

An e-mail creation support method according to another aspect of the present disclosure includes: storing in a storage device a keyword belonging to a keyword group and at least one address associated with the keyword group for each of the plurality of keyword groups; obtaining an image on a document; and recognizing a text included in the image on the document obtained, detecting, from the text recognized, a first prescribed word set beforehand and extracting a text portion of a predetermined length continuous before or after the first prescribed word detected, calculating, by each of the keyword groups stored in the storage device, a number representing matching between the keyword belonging to the keyword group and a character string included in the text portion extracted, selecting a keyword group having a largest number in the number representing the matching calculated, reading out from the storage device the address associated with the keyword group selected, and creating an e-mail a destination address of which is the address read out.

A computer-readable non-transitory recording medium according to another aspect of the present disclosure stores an e-mail creation support program, the e-mail creation support program causing a computer including a processor and a storage device to act, when the processor executes the e-mail creation support program, to execute: storing in a storage device a keyword belonging to a keyword group and at least one address associated with the keyword group for each of the plurality of keyword groups; obtaining an image on a document; and recognizing a text included in the image on the document obtained, detecting, from the text recognized, a first prescribed word set beforehand and extracting a text portion of a predetermined length continuous before or after the first prescribed word detected, calculating, by each of the keyword groups stored in the storage device, a number representing matching between the keyword belonging to the keyword group and a character string included in the text portion extracted, selecting a keyword group having a largest number in the number representing the matching calculated, reading out from the storage device the address associated with the keyword group selected, and creating an e-mail a destination address of which is the address read out.

BRIEF DESCRIPTION OF THE DRAWINGS

FIG. 4 is a diagram showing an e-mail entry screen displayed on a display device of the image forming apparatus of the one embodiment.

FIG. 5 is a diagram conceptually showing a data table that stores at least one keyword belonging to a keyword group and at least one address associated with the keyword group, for each of a plurality of keyword groups.

FIG. 6A is a diagram showing one example of a number representing matching between the keyword belonging to the keyword group and a character string included in a text portion extracted from the image on the document.

FIG. 6B is a diagram showing another example of the number representing the matching between the keyword belonging to the keyword group and the character string included in the text portion extracted from the image on the document.

FIG. 7 is a diagram showing the e-mail entry screen where a destination address and so forth are being filled in.

FIG. 8 is a diagram showing a modification of the data table.

DETAILED DESCRIPTION

Hereinafter, a description will be given of, with reference to the drawings, an electronic apparatus, an image forming apparatus, an e-mail creation support method, and a computer-readable non-transitory recording medium with an e-mail creation support program stored thereon, according to one embodiment of the present disclosure.

Figure 1:
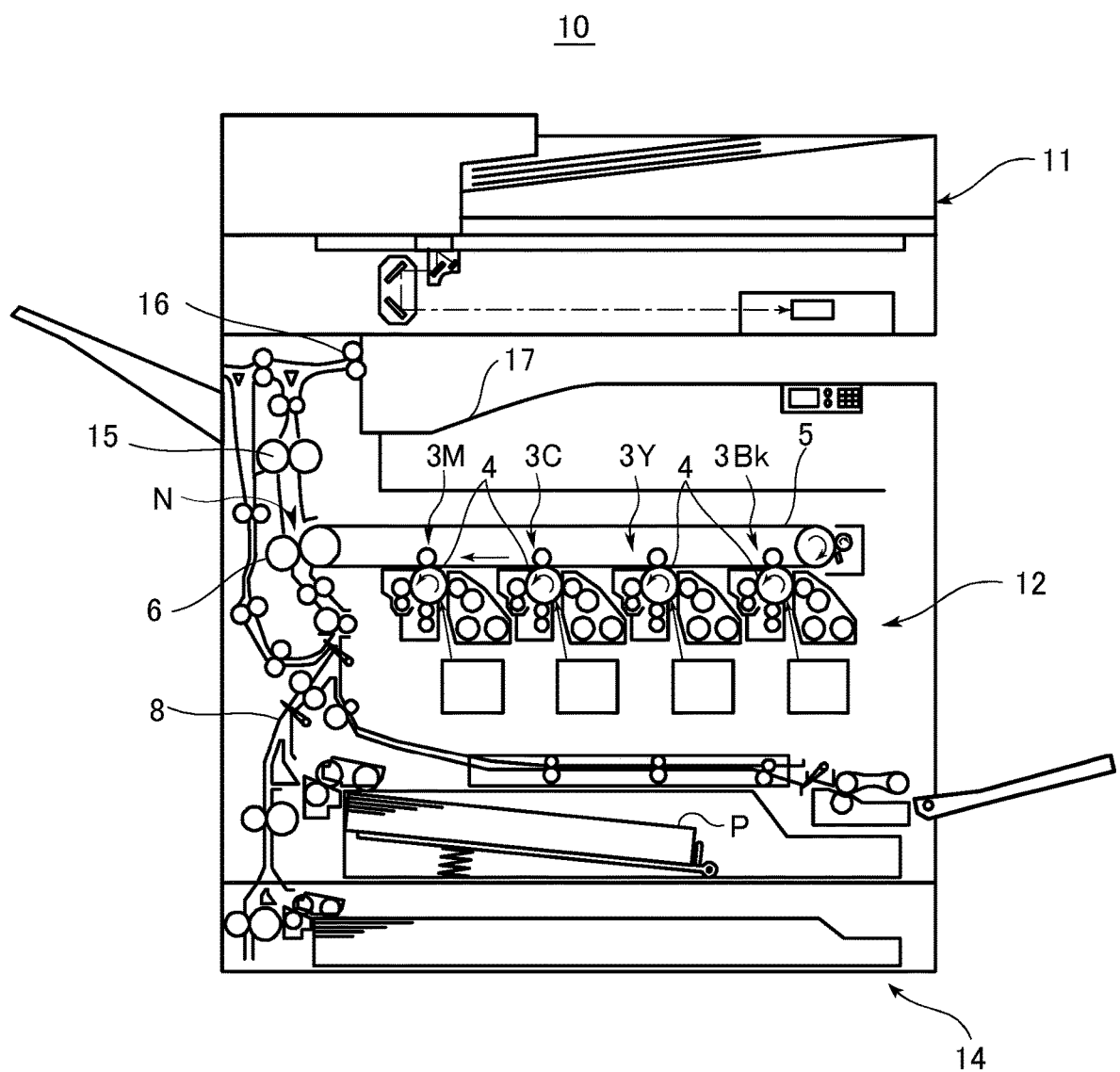
FIG. 1 is a cross-sectional view showing an image forming apparatus according to one embodiment of the present disclosure.

FIG. 1 is a cross-sectional view showing an image forming apparatus 10 according to the present embodiment. The image forming apparatus 10 is one embodiment of the electronic apparatus according to the present disclosure. The image forming apparatus 10 is a multi-functional peripheral (MFP) equipped with multiple functions, including a copy function, a print function, and a scan function. The image forming apparatus 10 includes an image reading device 11 and an image forming device 12.

The image reading device 11 includes an image pickup device that optically reads an image on a document. The image reading device 11 converts an analogue signal outputted from the image pickup device to a digital signal to thereby form image data showing the image on the document.

The image forming device 12 forms the image shown by the image data onto a recording sheet. The image forming device 12 includes an image forming subunit 3M for magenta, an image forming subunit 3C for cyan, an image forming subunit 3Y for yellow, and an image forming subunit 3Bk for black. In each of the image forming subunits 3M, 3C, 3Y, and 3Bk, the surface of a photoconductor drum 4 is uniformly charged, and an electrostatic latent image is formed on the surface of the photoconductor drum 4 by exposure. Then the electrostatic latent image on the surface of the photoconductor drum 4 is developed into a toner image, and the toner image on the photoconductor drum 4 is primary transferred to an intermediate transfer belt 5. Thus, the color toner image is formed on the intermediate transfer belt 5. The color toner image is secondary transferred to a recording sheet P transported along a transport route 8 from a paper feeding unit 14, at a nip region N formed between the intermediate transfer belt 5 and a secondary transfer roller 6.

Thereafter, the recording sheet P is press-heated in a fixing device 15, so that the toner image on the recording sheet P is fixed by thermal compression, and then the recording sheet P is discharged to an discharge tray 17 through a discharge roller pair 16.

Figure 2:
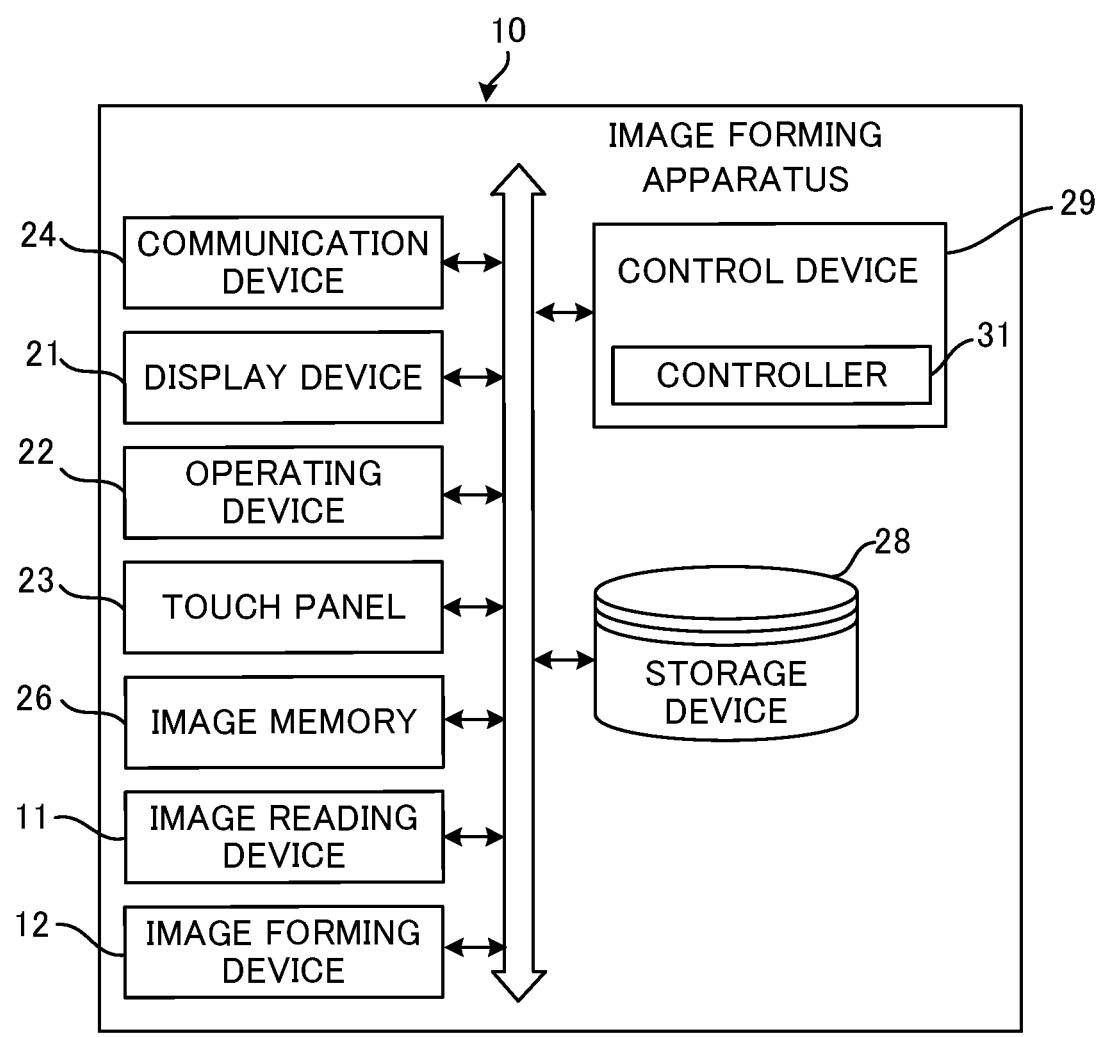
FIG. 2 is a functional block diagram showing essential parts of internal configurations of the image forming apparatus according to the one embodiment.

Next, configurations related to the control of the image forming apparatus 10 will be described. FIG. 2 is a functional block diagram showing essential parts of the internal configurations of the image forming apparatus 10. As shown in FIG. 2, the image forming apparatus 10 includes the image reading device 11, the image forming device 12, a display device 21, an operating device 22, a touch panel 22, a communication device 24, an image memory 26, a storage device 28, and a control device 29. The mentioned components are configured to transmit and receive data or signals to and from each other, via a bus.

The display device 21 is, for example, constituted of a liquid crystal display (LCD) or an organic light-emitting diode (OLED) display.

The operating device 22 is provided with hard keys such as numeric keys, determination key, and start key.

The touch panel 23 is overlapped on a screen of the display device 21. The touch panel 23 detects, together with the touched position, a contact (touch) of a finger of a user made on the touch panel 23, and inputs a user's instruction instructed on the screen of the display device 21. Accordingly, the touch panel 23 serves as an operating device into which user's operation performed on the screen of the display device 21 is inputted.

The storage device 28 includes a large-capacity solid state drive (SSD) or a hard disk drive (HDD), and contains various data and programs.

The control device 29 includes a processor, a random-access memory (RAM), a read-only memory (ROM), and so forth. The processor is, for example, a central processing unit (CPU), an application specific integrated circuit (ASIC), and a micro processing unit (MPU). The control device 29 functions as a controller 31 when the processor executes an e-mail creation support program stored in the ROM or in the storage device 28. Alternatively, the controller 31 may not be implemented by the operations in accordance with the aforesaid e-mail creation support program but may be constituted by a hardware circuit.

The controller 31 governs overall operation control of the image forming apparatus 10. The control device 29 is electrically connected with, for example, the image reading device 11, the image forming device 12, the display device 21, the operating device 22, the touch panel 23, the communication device 24, the image memory 26, and the storage device 28. The controller 31 performs the operational control of the aforesaid configuration elements, and transmits and receives signals or data to and from with each of the configuration elements.

The controller 31 serves a role as a processing unit that executes various kinds of processing. Furthermore, the controller 31 has a function for controlling display operation of the display device 21. The controller 31 also has a function for controlling communication operation of the communication device 24.

The operating device 22 and the touch panel 23 are examples of the operating device recited in What is claimed is.

In the image forming apparatus 10 having the configurations as described above, the controller 31 causes the image reading device 11 to read the image on the document, to be temporally stored in the image memory 26, then causes the image forming device 12 to record the image on the document on a recording sheet.

The image forming apparatus 10 has a function for creating an e-mail in accordance with the operation of the controller 31 based on the e-mail creation support program. For example, when the user operates the operating device 22 or the touch panel 23 to input a creation instruction of an e-mail, the controller 31 causes the display device 21 to display an e-mail entry screen. The user then operates the operating device 22 or the touch panel 23 to write the destination address, the body text, and so on into the e-mail entry screen, and input an instruction for an e-mail transmission. The controller 31 accepts the instruction, and sends the e-mail including these destination address, body text, and so on through the communication device 24 to a mail server on a network.

In creating an e-mail such way, in response to user operation, an instruction to execute address extraction processing is inputted into the operating device 22 or the touch panel 23: in the address extraction processing, an address indicating the e-mail destination is detected from the image on the document set in the image reading device 11, and the address is automatically generated. When the instruction to execute the address extraction processing is inputted, the controller 31 causes the image reading device 11 to read out the image on the document to be stored in the image memory 26, executes a known OCR function to recognize (analyze) characters included in the image on the document stored in the image memory 26, extracts an text consisting of the recognized characters, detects the address from the text, and writes the detected address in the e-mail entry screen as the destination address. Accordingly, the user can save trouble of entering address of e-mail.

Figure 3A:
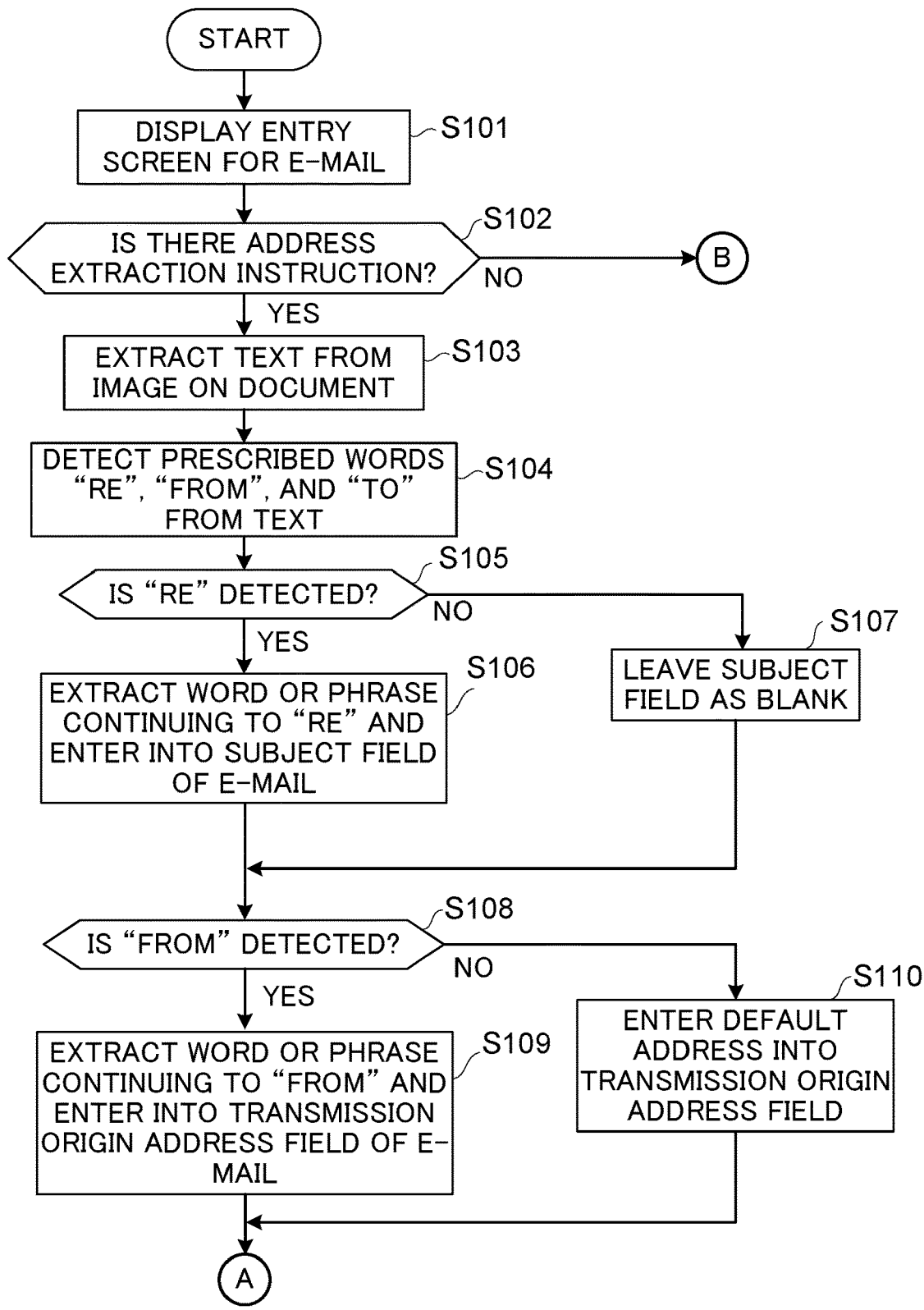
FIG. 3A is a flowchart showing a processing procedure for detecting a destination address from an image on a document and creating an e-mail.
Figure 3B:
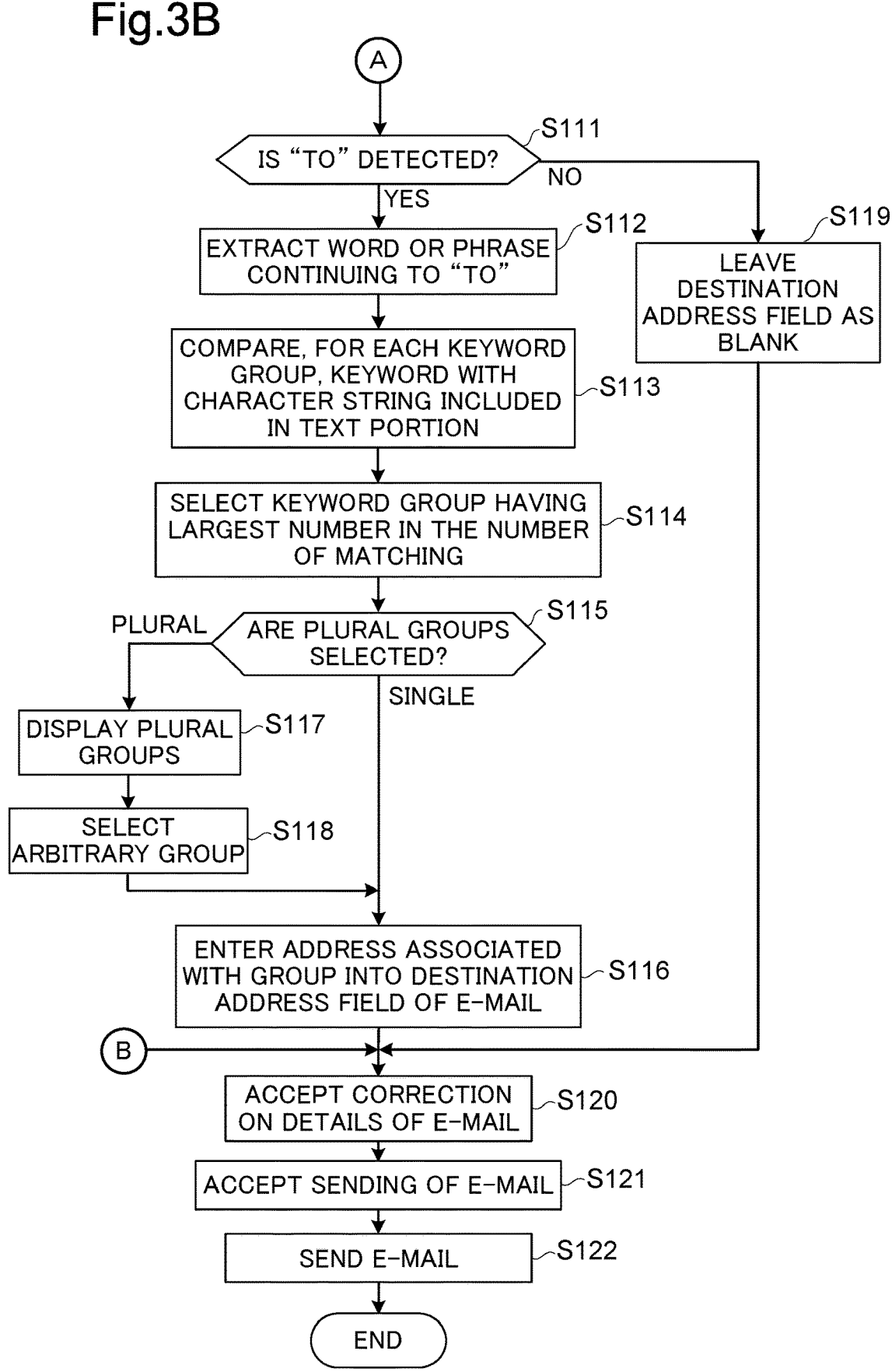
FIG. 3B is a flowchart showing a processing procedure subsequent to FIG. 3A.

Next, with reference to flowcharts shown in FIG. 3A and FIG. 3B, processing procedures in creating the e-mail will be detailed.

First, it is assumed that the creation instruction of the e-mail is inputted as described above and by the controller 31, an entry screen G1 for e-mail as shown in FIG. 4 is being displayed on the display device 21 (step S101). The entry screen G1 includes a field R1 for the destination address, a field R2 for the transmission origin address, a field R3 for the subject, and a field R4 for the body text. In addition, on the display device 21, together with the entry screen G1 for e-mail, an address extraction key K11 for instructing address extraction and a send key K12 for instructing sending of the e-mail.

Under the state where the entry screen G1 is being displayed, by setting the image on the document onto the image reading device 11 and touching the address extraction key K11, the user inputs an instruction to execute the address extraction processing by which the address indicating the destination of the e-mail is detected from the image on that document and the address is automatically generated. When accepting the instruction through the touch panel 23 ("YES" in step S102), the controller 31 causes the image reading device 11 to read the image on the document to be stored in the image memory 26.

In accordance with an application program of the known OCR function, which is stored in the storage device 28 and analyzes the image on the document stored in the image memory 26 and recognizes the character included in the image, the controller 31 recognizes the characters included in the image on the document stored in the image memory 26 and extracts the text consisting of the recognized characters (step S103).

The controller 31 then analyzes the text extracted in step S103, and detects preset prescribed words "Re", "From", and "To" included in the text (step S104). For example, when detecting the prescribed word "Re" in the text extracted in step S103 ("YES" in step S105), the controller 31 extracts a word or phrase continuous after the prescribed word "Re" from the text, causes the storage device 28 to store, as the subject, the extracted word or phrase, and fills in the field R3 for the subject of the entry screen G1 with the extracted word or phrase (step S106). The word or phrase continuous after the prescribed word "Re" means a character string starting from the right after the prescribed word "Re" to the next punctuation mark indicating a sentence break, or to a white space of a full or half width. The punctuation mark referred to the above includes punctuation marks such as commas used in an English letter, and the same shall apply hereinafter. For example, when extracting "This month's schedule" as the word or phrase (character string) continuous after the prescribed word "Re", the controller 31 causes the storage device 28 to store this extracted "This month's schedule" as the subject of the e-mail, and fills in the field R3 for the subject of the entry screen G1 with the extracted "This month's schedule". The controller 31 may extract a word or phrase continuous before the prescribed word "Re" from the text.

When the controller 31 cannot detect prescribed word "Re" from the text extracted in step S103 ("NO" in step S105), the controller 31, without causing the subject to be stored, leaves the field R3 for the subject of the entry screen G1 as a blank (step S107).

When detecting the prescribed word "From" in the text extracted in step S103 ("YES" in step S108), the controller 31 extracts a word or phrase continuous after the prescribed word "From", causes the storage device 28 to store, as the transmission origin address, the extracted word or phrase, and fills in the field R2 for the transmission origin address of the entry screen G1 with the extracted word or phrase (step S109). The word or phrase continuous after the prescribed word "From" means a character string starting from the right after the prescribed word "From" to the next punctuation mark indicating a sentence break, a character string with an underline starting right after the prescribed word "From", or a character string placed between parentheses ("< >"). For example, when extracting "Lotes.Key@ddp.com" as the word or phrase (character string) continuous after the prescribed word "From", the controller 31 causes the storage device 28 to store this extracted "Lotes.Key@ddp.com" as the transmission origin address, and fills in the field R2 for the transmission origin address of the entry screen G1 with the extracted "Lotes.Key@ddp.com". When the controller 31 cannot detect applicable word or phrase, right after the prescribed word "From", the controller 31 leaves the field R2 for the transmission origin address of the entry screen G1 as a blank. The controller 31 may extract a word or phrase continuous before the prescribed word "From" from the text.

When the controller 31 cannot detect the prescribed word "From" from the text extracted in step S103 ("NO" in step S108), the controller 31 causes the storage device 28 to store a default address as the transmission origin address, and fills in the field R2 for the transmission origin address of the entry screen G1 with default address (step S110).

Furthermore, when detecting the prescribed word "To" in the text extracted in step S103 ("YES" in step S111), the controller 31 extracts a text portion of a predetermined length continuous after the prescribed word "To" (step S112), and compares the character string included in the extracted text portion with the plurality of keywords stored in the storage device 28 (step S113).

A data table D as shown in FIG. 5 is stored in the storage device 28 beforehand. The data table D stores, for each of the plurality of keyword groups GA1 to GAN and GG1 to GGM, at least one keyword belonging to the keyword group, a name of the address group associated with the keyword group, and at least one address associated with the keyword group.

Each of the keyword groups GA1 to GAN is respectively associated with one address, and the keyword belonging to the keyword group is included in the address associated with the keyword group. For example, each keyword "Lotes" and "Labores" belonging to the keyword group GA1 is included in the address "Lotes.Labores@ddp.com" associated with the keyword group GA.

Each of the keyword groups GG1 to GGM is respectively associated with a plurality of addresses, and each keyword belonging to the keyword group is included in the name of the address group made up with each address. For example, the keyword "MANAGERS" belonging to the keyword group GG1 is included in the name of the address group "PDDK DIVISION MANAGERS", which is consisting of each address associated with the keyword group GG1.

The controller 31 refers to the data table D stored in the storage device 28 and compares, by each keyword group, the keyword belonging to the keyword group with the character string included in the text portion extracted in step S112, to thereby calculates a number representing matching (i.e., the number of matching) between the keyword and the character string included in the text portion, and selects the keyword group having a largest number in the number of matching calculated (step S114).

For example, when the character string "totes" and the character string "Labores" are included in the text portion extracted in step S112, each of the keywords "totes" and "Labores" belonging to the keyword group GA1 matches the character string "totes" and the character string "Labores", respectively, as shown in FIG. 6A, so that the number of matching in the keyword group GA1 is "2". Furthermore, since the keyword "Labores" belonging to the keyword group GA2 matches the one of the character strings, the number of matching in the keyword group GA2 is "1". Similarly, since the keyword "Lotes" belonging to the keyword group GA3 matches the other one of the character strings, the number of matching in the keyword group GA3 is "1". In this case, the largest number representing the matching is "2", so that the controller 31 selects the keyword group GA1 having the number of matching "2".

When the character string "MANAGERS" is included in the text portion extracted in step S112, the keyword "MANAGERS" belonging to the keyword group GG1 matches the character string "MANAGERS", as shown in FIG. 6B, so that the number of matching is "1". Furthermore, since the keyword "MANAGERS" belonging to the keyword group GG2 matches the character string, the number of matching is "1". In this case, the largest number representing the matching is "1", so that the controller 31 selects these two keyword groups of GG1 and GG2 having the number of matching "1".

The controller 31 then determines whether the keyword group selected in step S114 is one or plural (step S115). For example, as described above, when only the keyword group GA1 having the number of matching "2" is being selected, the controller 31 determines that the keyword group selected in step S114 is one ("SINGLE" in step S115), and reads out the address "Lotes.Labores@ddp.com" associated with the selected keyword group GA1 from the data table D, and fills in the field R1 for the destination address of the entry screen G1 with the read out address (step S116).

When two keyword groups of GG1 and GG2 having the number of matching "1" are being selected as described above, the controller 31 determines that the keyword groups selected in step S114 are plural ("PLURAL" in step S115), and reads out all addresses associated with the selected two keyword groups GG1 and GG2 from the data table D. The controller 31 causes the display device 21 to display, by the selected two keyword groups GG1 and GG2, each of the addresses associated with the keyword groups (step S117). At this point, by seeing the display content of the display device 21, the user can know each address associated with the keyword groups for the keyword groups GG1 and GG2 separately. When the user touches, on the screen of the display device 21, arbitrary one keyword group, an instruction to select the touched arbitrary one keyword group is inputted through the touch panel 23. Upon accepting the instruction to select the arbitrary one keyword group (step S118), the controller 31 causes the storage device 28 to store each address associated with this arbitrary one keyword group as the destination address, and fills in the field R1 for the destination address of the entry screen G1 with each of the addresses (step S116).

When the character string matching the keyword cannot be detected from the text portion continuous after the prescribed word "To", no address is extracted from the image on the document and the field R1 for the destination address is left as a blank. When the keyword groups selected in step S114 are plural ("PLURAL" in step S115), the controller 31 may, without performing the processing in step S117 and step S118, fill in the field R1 for the destination address of the entry screen G1 with all addresses associated with each keyword group (step S116). Alternatively, in performing the processing in step S117 and step S118, when, on the screen of the display device 21, the user touches and selects arbitrary one address, the controller 31 may cause the storage device 28 to store only the arbitrary one address as the destination address, and fill in the field R1 for the destination address of the entry screen G1 with only the arbitrary one address (step S116).

Also, when the prescribed word "To" cannot be detected in the text extracted in step S103 ("NO" in step S111), the controller 31, without extracting the destination address from the image on the document, leaves the field R1 for the destination address of the entry screen G1 as a blank (step S119).

As described thus far, the prescribed words "Re", "From", and "To" included in the image on the document are detected by the processing in step S103 to step S119, and on the basis of the detected prescribed words, the subject, the transmission origin address, and the destination address are extracted from the image on the document and stored in the storage device 28 by the controller 31. These subjects, transmission origin address, and destination address are to be respectively filled in the field R3 for the subject of the entry screen G1, the field R2 for the transmission origin address, and the field R1 for the destination address. When no the prescribed word "Re" is detected, the field R3 for the subject is left as a blank. In addition, when no the prescribed word "From" is detected, the controller 31 causes the storage device 28 to store the default address, and fills in the field R2 for the transmission origin address with the default address. When no applicable word or phrase are detected in the right after the prescribed word "From", the field R2 for the transmission origin address is left as a blank. Furthermore, when no prescribed word "To" is detected or no character string matching the keyword is detected from the text portion continuous after the prescribed word "To", the field R1 for the destination address is left as a blank. Thereby, the controller 31 causes the display device 21 to display, for example, the entry screen G1 as shown in FIG. 7.

The user operates the operating device 22 or the touch panel 23 while seeing the entry screen G1 for e-mail shown in FIG. 7 and corrects the destination address, the transmission origin address, and the subject, or, enters the body text into the entry screen G1 for e-mail. The controller 31 updates these corrected details and entered details as the destination address, the transmission origin address, and the subject, or the body text (step S120).

While the entry screen G1 for e-mail as shown in FIG. 4 is being displayed on the display device 21, if the controller 31 accepts no instruction to execute the address extraction processing ("NO" in step S102), the controller 31 does not extract the subject, the transmission origin address, and the destination address from the image on the document. In this case, the user operates the operating device 22 or the touch panel 23 while seeing the entry screen G1 for e-mail shown in FIG. 4 and corrects the destination address, the transmission origin address, and the subject, or enters the body text into the entry screen G1 for e-mail, and the controller 31 updates these corrected details and entered details as the destination address, the transmission origin address, and the subject, or the body text (step S120).

Then when the user touches the send key K12, the controller 31 accepts through the touch panel 23 an instruction to send the e-mail (step S121). Following this instruction, the controller 31 uses the destination address, the transmission origin address, the subject, and the body text being stored in the storage device 28 at this time point (the destination address, the transmission origin address, the subject, and the body text are being displayed on the entry screen G1) to send the e-mail to the mail server on the network from the communication device 24 (step S122).

In a generally known technique, when a recognition error (such as garbled characters) of a destination by OCR processing occurs, there is a possibility to acquire a wrong destination. Also, a generally known technique is of merely obtaining only the destination recognized by OCR processing, it cannot obtain a plurality of destinations collectively.

In contrast, in the present embodiment, when the user sets the image on the document onto the image reading device 11 and instructs the execution of the address extraction processing, the controller 31 causes the image reading device 11 to read the image on the document, extracts a text from the image on the document: furthermore, the controller 31 extracts a text portion of a predetermined length continuous after the prescribed word "To", compares, for each keyword group, the keyword belonging to the keyword group with the character string included in the extracted text portion, to thereby calculates the number of matching between the keyword and the character string included in the text portion, and selects the keyword group having a largest number in the number of matching calculated, creates an e-mail a destination address of which is at least one address associated with the keyword group selected, and sends the created e-mail. Accordingly, the user can save trouble of entering address of e-mail. Furthermore, in present embodiment, if a recognition error (such as garbled characters) of characters by OCR processing occurs, the keyword does not match with the character string included in the text portion. Thus, a situation of obtaining an incorrect destination address does not occur. Therefore, the address to be the destination can be accurately obtained. Further, in the present embodiment, when a plurality of addresses is associated with the selected keyword group, these addresses may be collectively set as the e-mail destination.

<Modification>

In the modification, a data table D shown in FIG. 8 is used as the data table described above. In the data table D shown in FIG. 8, for each of the keyword groups GA1 to GAN and GG1 to GGM, not only at least one keyword, the name of the address group, and at least one address are stored, but also a fixed form sentence (one example of the format data recited in What is claimed is) is stored.

When detecting in step S115 that the keyword group selected is one, or in step S118 that the arbitrary one keyword group is selected, the controller 31 fills in the field R1 for the destination address of the entry screen G1 with the address associated with the one keyword group, and reads out the fixed form sentence associated with the one keyword group from the data table D, causes the storage device 28 to store the fixed form sentence as the fixed form sentence to be used in the body text of the e-mail, and fills in the field R4 for the body text of the entry screen G1 with this fixed form sentence. Accordingly, the user can save trouble of entering the body text.

In addition to the fixed form sentence, a seal impression or logo mark may be stored in the data table D in association with the keyword group and be used in the body text of the email.

In the above described embodiment, the controller 31 extracts the text portion of the predetermined length continuous after the prescribed word "To". Alternatively, the controller 31 may extract a text portion of the predetermined length continuous before the prescribed word "To", compare the character string included in the extracted text portion with the keyword, and select a keyword group having a largest number in the number of matching between the keyword and the character string included in the text portion.

In addition, the controller 31 may be configured to set "cc", which indicates an address of broadcast communication at transmission of e-mails, as the prescribed word, extract a text portion of the predetermined length continuous after or before this prescribed word "cc", compare, for each keyword group, a character string included in the extracted text portion with the keyword, select a keyword group having a largest number in the number of matching between the keyword and the character string included in the text portion, read out an address associated with the selected keyword group, and use the address as so-called the destination for cc.

The e-mail creation support program described above may be stored in a computer-readable non-transitory recording medium such as a hard disk, a CD-ROM, a DVD-ROM, and a semiconductor memory.

The present disclosure is not limited to the image forming apparatus of the above embodiment and may be applied to other apparatuses such as a copier.

The configurations and processing shown in the above embodiments and the modification with reference to FIGS. 1 to 8 are merely illustrative of the present disclosure and not intended to limit the present disclosure to the above particular configurations and processing.

While the present disclosure has been described in detail with reference to the embodiments thereof, it would be apparent to those skilled in the art the various changes and modifications may be made therein within the scope defined by the appended claims.

What is claimed is:

1. An electronic apparatus comprising:
   a storage device in which a keyword belonging to a keyword group and at least one address associated with the keyword group are stored for each of a plurality of keyword groups;
   an image reading device that reads an image on a document;
   a controller including a processor and, when the processor executes an e-mail creation support program, functioning so as to recognize a text included in the image on the document read by the image reading device, detect, from the text recognized, a first prescribed word set beforehand and extract a text portion of a predetermined length continuous before or after the first prescribed word detected, calculate, by each of the keyword groups stored in the storage device, a number representing matching between the keyword belonging to the keyword group and a character string included in the text portion extracted, select a keyword group having a largest number in the number representing the matching calculated, read out from the storage device the address associated with the keyword group selected, and create an e-mail a destination address of which is the address read out;

a display device; and an operating device to be operated by a user, wherein when the controller selects plural keyword groups in selecting the keyword group having the largest number in the number representing the matching calculated, the controller causes the display device to display the plural keyword groups selected, reads out, when any one of the plural keyword groups is selected by operation to the operation unit, from the storage device, the address associated with the keyword group selected, and creates the e-mail a destination address of which is the address read out.

2. The electronic apparatus according to claim 1, wherein the controller detects, as the first prescribed word, "To" indicating the destination address of the e-mail.

3. The electronic apparatus according to claim 1, wherein the controller extracts a text portion consisting of a certain number of characters as the text portion of the predetermined length.

4. The electronic apparatus according to claim 1, wherein the controller further detects "Re" as a second prescribed word set beforehand from the text recognized, extracts a text portion of the predetermined length continuous before or after the second prescribed word detected, and creates the e-mail a subject of which is a character string included in the text portion extracted.

5. The electronic apparatus according to claim 1, wherein the controller further detects "From" as a third prescribed word set beforehand from the text recognized, extracts a text portion of the predetermined length continuous before or after the third prescribed word detected, and creates the e-mail a transmission origin address of which is a character string included in the text portion extracted.

6. An image forming apparatus comprising:

the electronic apparatus according to claim 1; and an image forming device forming an image on a recording medium.

7. An electronic apparatus comprising:

a storage device in which a keyword belonging to a keyword group and at least one address associated with the keyword group are stored for each of a plurality of keyword groups;

an image reading device that reads an image on a document; and a controller including a processor and, when the processor executes an e-mail creation support program, functioning so as to recognize a text included in the image on the document read by the image reading device, detect, from the text recognized, a first prescribed word set beforehand and extract a text portion of a predetermined length continuous before or after the first prescribed word detected, calculate, by each of the keyword groups stored in the storage device, a number representing matching between the keyword belonging to the keyword group and a character string included in the text portion extracted, select a keyword group having a largest number in the number representing the matching calculated, read out from the storage device the address associated with the keyword group selected, and create an e-mail a destination address of which is the address read out;

wherein the storage device further stores format data associated with the keyword group for each of the plurality of keyword groups, and the controller reads out from the storage device the address and the format data associated with the keyword group selected, creates the e-mail a destination address of which is the address read out, and inserts the format data read out into the e-mail as a body text of the e-mail.

* * * * *